United States Patent [19]

Hansson

[11] Patent Number: 4,496,164

[45] Date of Patent: Jan. 29, 1985

[54] CHISEL RETAINING DEVICE

[75] Inventor: Gunnar C. Hansson, Stockholm, Sweden

[73] Assignee: Atlas Copco Aktiebolag, Nacka, Sweden

[21] Appl. No.: 324,436

[22] Filed: Nov. 24, 1981

[30] Foreign Application Priority Data

Nov. 27, 1980 [SE] Sweden ................................ 8008307

[51] Int. Cl.[3] ............................................ B23B 31/08

[52] U.S. Cl. ..................................... 279/19.6; 279/77; 279/90

[58] Field of Search .................. 279/1 ME, 35, 1 TE, 279/106, 19.1, 19.2, 19.3, 19.6, 19.7, 24, 19, 76, 78, 77, 79, 89, 90, 80, 102, 29; 173/133, 137; 403/330, 327

[56] References Cited

U.S. PATENT DOCUMENTS

| | | | |
|---|---|---|---|
| 1,105,669 | 8/1914 | Levedahl et al. | 279/19.6 |
| 1,666,425 | 4/1928 | Mock | 279/19.1 |
| 1,693,872 | 12/1928 | Shaff . | |
| 1,694,106 | 12/1928 | Richardson | 279/19.1 |
| 2,999,407 | 9/1961 | Frangesco | 279/1 ME |
| 3,454,284 | 7/1969 | Moores | 279/19.1 |
| 3,563,559 | 2/1971 | Taylor | 279/19 |

FOREIGN PATENT DOCUMENTS

| | | | |
|---|---|---|---|
| 1277770 | 9/1968 | Fed. Rep. of Germany . | |
| 112787 | 1/1918 | United Kingdom | 279/19.6 |
| 713196 | 8/1954 | United Kingdom | 279/19 |

*Primary Examiner*—Z. R. Bilinsky
*Assistant Examiner*—Thomas M. Kline
*Attorney, Agent, or Firm*—Frishauf, Holtz, Goodman & Woodward

[57] ABSTRACT

A chisel retaining device for a power operated percussion tool comprises a one-piece lock shell (20) which surrounds the chisel stem (17) and is pivotably supported on the front end of the tool housing (10). By pivoting the shell (20) about an axis (X) transverse to the chisel axis a large dimension part (29) or a small dimension part (28) of a front opening (27) of the shell (20) are alternatively aligned with the chisel (15) to prevent or permit passage of a flange (18) on the chisel (15). A spring means (24) is provided to keep the shell (20) in closed position. An internal annular shoulder (21) of the shell (20) cooperates with a toroidal spring (22) received in a circumferential groove (23) on the housing (10) to form an axial abutting means for the shell (20), and an inwardly projecting heel (31) forms together with the shoulder (21) and the toroidal spring (22) a pivot means for the shell (20).

5 Claims, 7 Drawing Figures

CHISEL RETAINING DEVICE

BACKGROUND OF THE INVENTION

The present invention relates to a chisel retaining device for a power operated percussion tool. In particular the invention pertains to a chisel retaining device of the type comprising a lock shell surrounding the chisel stem as well as the front end of the tool housing for axially locking the chisel relative to the housing.

The lock shell is pivotable between a closed and an open position.

In a prior art device of this type shown in U.S. Pat. No. 1,584,767 a lock shell is pivotably supported on the tool housing by two trunnious. The lock shell is lockable in its closed position by means of a separate lock pin which has to be removed from the shell to allow the latter to be moved to its open position. In this known device the impact forces to which the lock shell is exposed at no load strokes are transferred to the housing by the two trunnious which means that the trunnious as well as the lock shell have to be of a heavy and rather complicated design to withstand the occurring forces.

In another prior art device disclosed in U.S. Pat. No. 2,999,407, a lock shell is axially arrested relative to the tool housing as well as the chisel by means of toroidal lock springs inserted through apertures in the shell and received in peripheral grooves in the housing and the shell. Though this is quite a simple and rigid design it is rather awkward to handle at chisel replacements, because one or both of the lock springs have to be removed and reinserted. This is a time consuming procedure, especially when it has to be carried out in a cold and/or dirty environment.

The main object of the invention is to accomplish a chisel retaining device which offers in combination a safe protection against throwing out of the chisel at no load strokes and a simple and easy to handle constructive concept.

Other objects and features of the invention will be apparent from the following detailed description and the drawings.

DETAILED DESCRIPTION

Figure 1:
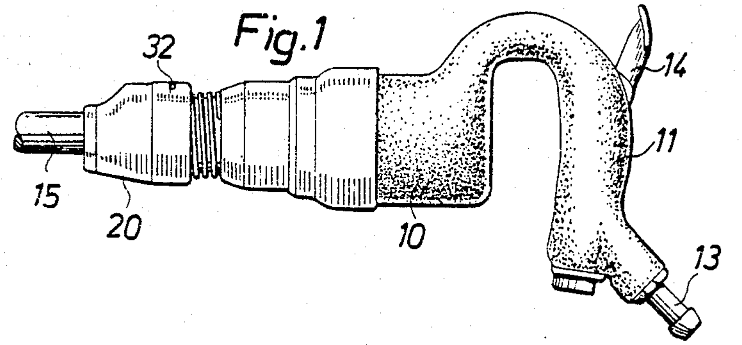
FIG. 1 shows a side elevation of a penumatic percussion tool provided with a chisel retaining device according to the invention.
Figure 2:
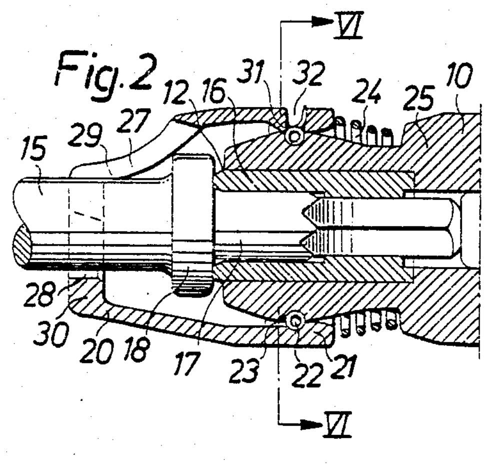
FIG. 2 shows, on a larger scale, a longitudinal section through the front part of the tool and chisel retaining device in FIG. 1. The retaining device is illustrated in its engaged position.
Figure 3:
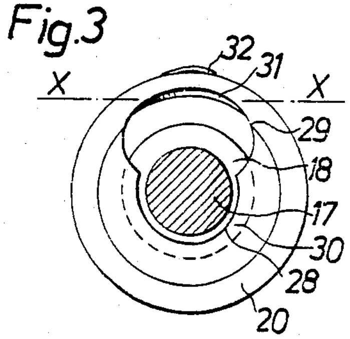
FIG. 3 shows an end view of the device shown in FIG. 2.

The percussion tool shown on the drawing comprises a housing 10 formed with a handle 11 at its rear end and with an opening 12 at its forward end for receiving the rear stem portion 17 of a chisel 15.

The handle 11 forms a part of the pressure air supply passage through which motive air is conducted from a connection nipple 13 via a throttle valve (not shown) operated by a lever 14 to the impact mechanism lodged in the housing 10.

At its chisel receiving opening 12, the tool housing 10 is provided with a guide bushing 16 for firmly guiding the rear chisel stem portion 17 introduced into the tool. The chisel 15 is formed with an annular flange 18 which in the working position of the chisel 15 rests against the forward end of the guide bushing 16.

A tubular lock shell 20 is pivotably supported on the forward end of the tool housing 10. An internal annular shoulder 21 in the lock shell 20 fits snuggly on the tool housing 10 and is arranged to cooperate with a toroidal support spring 22 resting in a circumferential grove 23 in the housing 10 to positively block the shell 20 from being axially moved reltaive to the housing 10. A coil type compression spring 24 is inserted between the rear end of the lock shell 20 and an enlarged diameter portion 25 of the housing 10 to urge the shell 20 forwards, thereby keeping the shoulder 21 in full contact with the support spring 22.

At its front end, the lock shell 20 is formed with an opening 27 through which the chisel 15 extends. The opening 27 comprises two parts of different cross sectional dimensions, namely a smaller part 28 which is coaxial with the shell 20 and of less diameter than the annular flange 18 of the chisel 15 and a larger part 29 permitting passage of the chisel flange 18. The part-circular rim 30 of the smaller opening part 28 forms an abutting means which is arranged to engage the shoulder forming front side of the chisel flange 18 to positively block the chisel 15 from falling out of the tool.

A full circumferential contact between the shoulder 21 and the spring 22 guarantees that the shell 20 is able to transfer to the housing 10 those impact forces that are generated at no load strokes when the chisel 15 is thrown forwards and the flange 18 hits the shell 20.

The lock shell 20 also comprises an inwardly projecting heel 31 which is arranged to form a pivot support for the shell 20 by engaging the support spring 22 on the opposite side of the annular shoulder 21. The heel 31 is located to the same radial direction of the shell 20 as the widened part 29 of the shell opening 27.

For enabling mounting of the toroidal support spring 22, the shell 20 is formed with a peripheral aperture 32.

The lock shell 20 is mounted on the tool housing 10 by entering it onto the front part of the latter against the action of spring 24 and by insertion of the annular support spring 22 through aperture 32.

Figure 4:
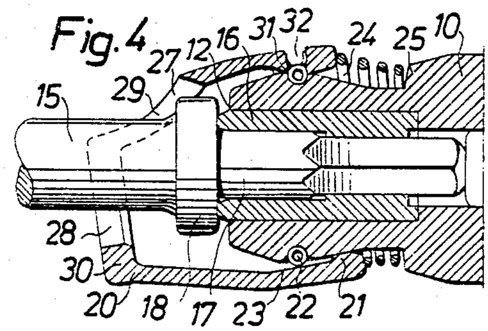
FIG. 4 shows the same section as FIG. 2 but illustrates the device in its release position.
Figure 5:
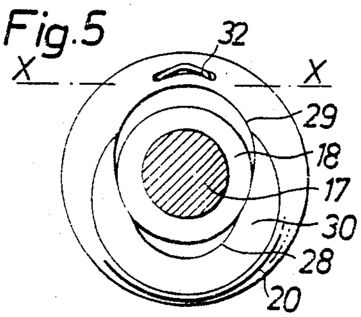
FIG. 5 shows an end view of the device shown in FIG. 4.
Figure 6:
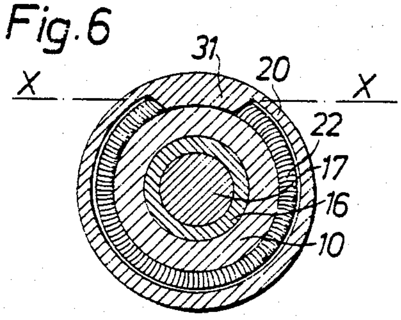
FIG. 6 shows a cross section through the retaining device as indicated by line VI—VI in FIG. 2.
Figure 7:
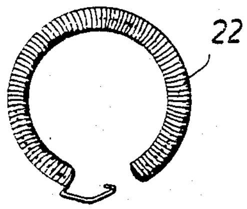
FIG. 7 shows separately the toroidal support spring.

For insertion or removal of the chisel, the shell is pivoted about an axis X transverse to the longitudinal axis of the tool and the chisel 15 against the action of spring 24. The pivot axis X extends tangentially through the support spring 22 right where the inwardly projecting heel 31 of the shell 20 is located. In the open or release position of the shell 20, illustrated in FIGS. 4 and 5, the rim portion 30 of the smaller opening part 28 which forms an abutting means for the chisel flange 18 is moved aside and the latter is able to be passed through the opening 27.

The retaining device according to the invention is advantageous in that it provides not only a proper and safe lock function but a very easy and reliable handling.

It is to be noted that the embodiments of the invention are not limited to the shown and described example. For instance, the spring 24 which exerts a continuous forward directed bias load on the lock shell 20 to keep the latter in engaged or closed position may be replaced by a spring loaded latch. In that case, of course, the latch has to be opened to enable opening of the lock shell 20.

I claim:

1. A chisel retaining device for a power operated percussion tool producing an impact in a given direction, wherein the percussion tool includes a housing (10) having a front end, and the chisel includes a chisel stem (17), the chisel retaining device comprising:

a tubular lock shell (20) surrounding the chisel stem (17) as well as the front end of the tool housing (10) and being pivotably supported on the tool housing (10) for movement between a chisel locking position and a chisel releasing position;

said lock shell (20) having a rear end with an internal annular shoulder (21) facing an impact direction of the tool;

said tool housing (10) having an annular peripheral groove (23) formed thereon;

a toroidal support spring (22) received in said peripheral groove (23) of said tool housing (10) for abutting cooperation with said annular shoulder (21);

said lock shell (20) having an inwardly projecting heel (31) which together with said annular shoulder (21) and said toroidal support spring (22) forms a pivot means for the lock shell (20).

2. The chisel retaining device of claim 1, wherein said chisel is formed with an annular shoulder (18), and said lock shell (20) has a front opening (27) comprising a concentric part (28) of smaller cross section than said shoulder (18) and an offset part (29) of larger cross section than said shoulder (18), said heel (31) being located in the same radial direction as said offset opening part (29).

3. The chisel retaining device of claim 1 or 2, comprising a spring means (24) cooperatively coupled to said lock shell (20) to ensure a full circumferential contact between said annular shoulder (21) on said lock shell (20) and said support spring (22) as said lock shell (20) occupies its chisel locking position.

4. The chisel retaining device of claim 3, wherein said spring means (24) is arranged to continuously bias said lock shell (20) toward said chisel locking position.

5. The chisel retaining device of claim 1, wherein said heel (31) abuts said toroidal spring and pivots substantially about the abutment point.

* * * * *